(12) United States Patent
Vogel et al.

(10) Patent No.: US 8,108,996 B2
(45) Date of Patent: Feb. 7, 2012

(54) METHOD OF PRODUCING SHAFTS

(75) Inventors: Manfred Vogel, Kappelrodeck (DE); Volker Szentmihályi, Gutach (DE)

(73) Assignee: Nuemayer Tekfor Holding GmbH, Hausach (DE)

( * ) Notice: Subject to any disclaimer, the term of this patent is extended or adjusted under 35 U.S.C. 154(b) by 0 days.

(21) Appl. No.: 12/779,975

(22) Filed: May 14, 2010

(65) Prior Publication Data

US 2010/0218583 A1  Sep. 2, 2010

Related U.S. Application Data

(60) Division of application No. 12/025,339, filed on Feb. 4, 2008, now abandoned, which is a continuation of application No. PCT/DE2005/01587, filed on Sep. 10, 2005.

(30) Foreign Application Priority Data

Aug. 4, 2005  (DE) .......................... 10 2005 036 681

(51) Int. Cl.
*B21D 53/84* (2006.01)

(52) U.S. Cl. .......... 29/888.1; 29/525; 29/894.3; 72/356; 123/90.17

(58) Field of Classification Search ...................... 29/525, 29/888.1, 894.3, 894.362; 72/356; 74/567; 123/90.17

See application file for complete search history.

(56) References Cited

U.S. PATENT DOCUMENTS

| | | | |
|---|---|---|---|
| 4,922,767 A | 5/1990 | Toshifumi | |
| 4,998,344 A * | 3/1991 | Hsieh | ...................... 29/894.362 |
| 5,000,612 A | 3/1991 | Swars | |
| 5,081,880 A | 1/1992 | Swars | |
| 5,086,660 A | 2/1992 | Swars | |
| 5,850,695 A * | 12/1998 | Klaas et al. | .................. 29/888.1 |
| 6,286,196 B1 | 9/2001 | Vogel | |
| 6,523,512 B2 * | 2/2003 | Axmacher et al. | ......... 123/90.17 |
| 6,726,571 B2 | 4/2004 | Ferriman et al. | |
| 6,804,884 B1 | 10/2004 | Vogel | |
| 2004/0134063 A1 | 7/2004 | Vogel | |
| 2006/0251472 A1 | 11/2006 | Stauber | |

FOREIGN PATENT DOCUMENTS

| | | |
|---|---|---|
| DE | 2914657 A1 | 10/1980 |
| DE | 3409541 A1 | 11/1985 |
| DE | 3425600 A1 | 1/1986 |
| DE | 8713285 U1 | 12/1987 |
| DE | 19718307 A1 | 11/1998 |
| DE | 19831333 A1 | 1/2000 |
| DE | 19938791 A1 | 3/2001 |
| DE | 10101539 A1 | 8/2002 |
| DE | 10319629 A1 | 11/2004 |
| EP | 0 849 502 A2 | 6/1998 |

* cited by examiner

*Primary Examiner* — Richard Chang
(74) *Attorney, Agent, or Firm* — Crowell & Moring LLP

(57) ABSTRACT

A method of producing shafts such as shafts used in a transmission, particularly for a motor vehicle, is provided. A shaft base body and at least one gearwheel, which is at least substantially finished separately from the shaft and subsequently is fixed to the shaft in such a way as to transmit torque available at the shaft or input torque by the gearwheel having a hollow hub body and being axially pressed onto a seat on the shaft base body so as to form a frictional connection which transmits the torque from the shaft to the gearwheel.

9 Claims, 2 Drawing Sheets

METHOD OF PRODUCING SHAFTS

CROSS REFERENCE TO RELATED APPLICATIONS

This application is a divisional of U.S. application Ser. No. 12/025,339, filed Feb. 4, 2008, which is a continuation of international patent application no. PCT/DE2005/001587, filed Sep. 10, 2005 designating the United States of America and published in German on Feb. 8, 2007 as WO 2007/01537, the entire disclosure of which is incorporated herein by reference. Priority is claimed based on Federal Republic of Germany patent application no. DE 10 2005 036 681.3, filed Aug. 4, 2005.

BACKGROUND OF THE INVENTION

The present invention relates to a transmission, in particular for motor vehicles, having at least two shafts which transmit torque, such as main or output shaft, countershaft, or the like, each having at least one fixed gearwheel provided thereon for direct torque transmission from the gearwheel to the shaft and vice versa, as well as a method for producing such shafts.

A known method for producing torque transmitting shafts comprises initially producing them together with the fixed gearwheels in one piece as a forging blank. This is followed by a complex machining of the various functional sections, such as the gearing areas for the synchronization units, the bearing seats, the bearing races, and the threads. The entire relatively large and cumbersome part must thus be transported and therefore handled at the diverse machining points and/or machines for each of the individual machining steps, for example, and a uniform, relatively high-quality, and thus costly material must be used for all sections, which additionally represents a compromise solution, however, because the optimal materials may not be used for the individual functional points and/or sections. These known shafts are not only, as already noted, very complex to produce, but additionally relatively costly, have a high weight, and are cumbersome to handle. In addition, shafts of this type significantly limit the design freedom of a transmission, particularly if two such gearwheels are provided on the shaft, because no functional bodies rotatable in relation thereto, such as idlers, synchronization units, bearings, or the like, may be provided between them.

SUMMARY OF THE INVENTION

The present invention avoids the disadvantages of the previously known transmissions and their shafts and simplifies the production of transmissions and also of shafts in general, including shafts for transmissions, thereby making the production process more cost-effective and the shafts better able to be handled. In addition, the invention makes it possible to use optimum materials for individual functional sections, to save weight and thus costs of the shaft, and to expand the design possibilities of transmissions. Furthermore, due to the greatly increased flexibility in the construction of the shaft, e.g., with the combination of various gearwheels on the same shaft main body, the invention makes it possible to tailor the transmission to the particular engine characteristic and/or performance class desired.

In accordance with the present invention at least one of the shafts comprises a shaft main body and at least one gearwheel at least essentially completely machined per se, having a hollow hub body which is axially pressed onto a seat on the shaft main body and thereby fixed on the shaft via a friction-locked connection which transmits the drive torque available at the shaft, i.e., the input torque.

A shaft of this type can be produced with simple production methods and in an economically advantageous manner, inter alia, because both the shaft seat and also the hub seat may be constructed circular, so that the shaft seat and the hub seat can be produced very reasonably in contrast to polygonal seats or production by flaring a hollow shaft.

Methods and tools which may be employed to produce the shaft and/or gear hub which form a connection suitable for transmitting torque by axially pressing on a gearwheel having a relatively narrow hub, whose axial width at least does not significantly exceed the width of the gear and which ensures the transmission of the high torque occurring in a transmission from the gearwheel to the shaft and vice versa, are described, for example, in U.S. Pat. No. 6,286,196 (=DE 198 31 333) and/or in U.S. Pat. No. 6,804,884 (=DE 199 38 791) and/or US patent publication no. 2004/134063 (=DE 101 01 539), the disclosures of which are incorporated by reference herein in their entireties.

The gears may, for example, be fixed to the shaft by a fastening process as described in U.S. Pat. No. 6,286,196 in which a hollow shaft is extended through bores in the components until the components are positioned in specified locations on the shaft, and a pressure fluid is then introduced into the hollow interior of the shaft to expand the shaft and produce a press fit between the components and the expanded shaft. Advantageously, a plurality of support matrices may be positioned against intervening sections of the hollow shaft between the components in order to brace the intervening sections of the hollow shaft against expansion by the pressure fluid. Alternatively, the gears may be fixed to the shaft by a fastening process as described in U.S. Pat. No. 6,804,884 in which a part with an inner bore is pushed onto the shaft into a predetermined position with frictional contact to produce a press fit connection. Advantageously, the part with the bore may be provided with a substantially wedge-shaped lubricant groove on the front face of the part surrounding the bore from which lubricant is drawn into the bore as the part is pushed onto the shaft to reduce the friction between the part and the shaft. After the part has reached the desired position, the lubricant may be treated, e.g. by heating, to eliminate its friction reducing function and provide a secure friction fit. In yet another alternative, the gears may be fixed to the shaft by a process as described in US 2004/0134063 in which the shaft is stretched to reduce its diameter, after which a part having a bore with a diameter between the unstretched diameter and the stretched diameter of the shaft is moved to the desired position on the shaft and then the stretching force is released so that the shaft can expand again to produce a secure friction fit with the bore of the part.

By designing a transmission and/or shafts for a transmission in accordance with the present invention, not only are the advantages described above achieved, but also the required axial installation length may be significantly decreased because of the short axial hub lengths.

In addition, the production of such a shaft may be made significantly simpler, easier, and cheaper, as well as improved, in that the shaft main body is assembled in its length from at least two components, e.g., welded together, because the optimum materials may then be used for the various functional sections.

A further improvement and reduction in cost, which is also characterized by lower material use, results if, in accordance with an optional further feature of the present invention, the shaft main body is constructed at least partially tubular, i.e., hollow. It is particularly advantageous if the seats for pressing on the gearwheels are located on the tubular sections. Thus the torque coming from the drive engine and/or the input torque from the gearwheel is transmitted via the gearwheel hub to the hollow regions of the shaft main body and/or vice versa.

A shaft main body constructed in this way as at least partially tubular may be distinguished in that the shaft main body is constructed hollow and/or tubular between its two end areas, which have the smaller diameter areas. This tubular area may be composed of a standard tube material, which has been worked by metal forming and/or by machining. Such a shaft main body may be constructed by forming the end areas of the shaft main body solid or partially solid and then joining these end pieces to the tubular shaft main body located between them. At least one of the end parts and/or areas of the shaft main body may also be constructed at least partially tubular.

A further advantageous embodiment may result if the shaft main body is assembled from two components each having an end area and a tubular area, whose tubular areas are oriented toward one another and are attached to one another by connecting their tubular regions.

The components of the shaft main body may advantageously be joined to each other by welding, e.g., by laser beam welding or by friction welding, which is especially advantageous for specific applications.

Furthermore, it is advantageous if at least the tubular region is produced by metal forming, such as cold and/or hot forming, e.g., cold and/or hot extrusion. At least one of the end pieces may also be constructed at least partially tubular and be produced by massive forming. The aforementioned tubular middle part also may be produced by massive forming, such as cold and/or hot metal forming.

Furthermore, it is advantageous if the functional areas of the shaft main body, such as bearing seat, gearing, bearing race, seat areas for the gearwheel, are finish machined after the assembly of the individual partial areas and at least one of the gearwheels is subsequently pressed on.

According to a further feature of the present invention, in addition to the advantages already cited, the design options and structural possibilities of transmission shafts may be expanded and optimized further in that in transmissions in which two or more gearwheels are provided rotationally fixed on a shaft, an axial region between the two successive gearwheels may be provided with at least one further functional body, such as bearing, in particular a one-piece bearing,
an idler, or
a synchronization unit, before the mounting of at least the second gearwheel. Other elements may thus be provided here in a small axial installation space between the two gearwheels.

Openings or apertures may also be provided in an especially simple way in the gearwheels on shafts according to the present invention, because such openings, which save weight and material, may be introduced in the individual gearwheel itself, e.g., at the same time the gearwheel is produced. Mass forming techniques (e.g. casting) may be especially suitable for this purpose.

Furthermore, an especially advantageous possibility is provided by the present invention to press various gearwheels, i.e., gears having different tooth counts, onto uniform shaft main bodies, and thereby forming transmissions having different characteristics using uniform standard shaft bodies, which allows more cost-effective production of at least the main body due to production of higher piece counts, and also better warehousing, i.e., less logistical effort, due to a reduction in the total number of different parts which must be inventoried.

In a further, especially advantageous step according to the present invention, a main body for a shaft, e.g., a transmission shaft having pressed-on gearwheels, is made in one piece and is at least partially hollow, and is at least partially produced by "swaging," "rotary swaging" or a similar method, i.e., according to a "pressure forming method." Such shafts may be produced very cost-effectively, as is also apparent from the following description. Information regarding "rotary swaging" is known in the art, for example from the internet webpage www.hmp.com of Jul. 25, 2005 of HMP Maschinenfabrik GmbH, Göppinger Strasse 1-3, D-75179 Pforzheim.

Although this part of the present invention will be described hereinafter predominantly with reference to transmission shafts, it should understood that the present invention is also directed to other types of shafts, namely to shafts in general.

It is especially advantageous not to produce such a hollow shaft from a tube, but rather from a solid material, as is described in the following. A solid material allows the production of significantly more cost-effective hollow shafts.

The hollow shaft, i.e., for example, the main body may be constructed by "rotary swaging," "swaging," or the like in such a way that at least one or both of the ends is closed.

In accordance with one advantageous method, an at least partially hollow and one-piece shaft, such as a main body for a transmission shaft, may be produced in that a preform or blank is initially produced. The preform advantageously may be produced by massive forming from a solid material, expediently a cut-off section of a rod material, and massive forming, such as an extrusion method, is used to create a first partial region, which at least approximately receives the final shape of a first partial region of the finished shaft main body, having a "netshape" or "near netshape" quality. During the massive forming procedure, a material reserve, i.e., a material accumulation, is additionally formed on the preform axially adjoining the first partial region. From this material accumulation, in at least one further work step, namely by "rotary swaging," "swaging," or the like, the further partial area of the at least approximately finished shaft main body is then manufactured, advantageously also having a "netshape" or "near netshape" quality.

The preform produced by massive forming is constructed at least partially hollow, i.e., both the area of the material reserve and also the partial area at least approximately corresponding to the final shape of the first partial area of the shaft main body up to at least approximately its shaft end area are hollow. However, the shaft end area may also be constructed hollow, and therefore the entire blank.

As already noted, the further, hollow partial area—inter alia using mandrels or the like to generate the hollow internal contour—is then produced by "rotary swaging" or "swaging" or the like from the hollow material accumulation. The corresponding end area is formed after withdrawing the last mandrel. This end area may now remain hollow or may then be closed by "rotary swaging," "swaging," or the like, advantageously at least liquid-tight, but particularly preferably gas-tight, so that no oil may enter the shaft itself during operation of the transmission shaft, which is desirable for many applications.

If the shaft is produced from a preform which is continuously hollow, if necessary, the end area of the first partial area may also be closed by "rotary swaging" and thus sealed.

It is especially advantageous and economical for the production of a transmission shaft in particular, if during production of a first partial area by massive forming and production of a further partial area by "rotary swaging" or "swaging" or the like, at least some of the following functional areas and/or sections are brought at least approximately to their final dimensions:

bearing seat for mounting and centering the transmission shaft, areas for forming the synchronization gearing, bearing races for the roller bodies for mounting the idlers, hub seat area for a gearwheel which may be pressed on axially.

It is especially advantageous, both in regard to material use and also in regard to efficient and cost-effective production, if shaft main bodies according to the present invention are provided with gearwheels which are applied according to at least one of the methods described in U.S. Pat. No. 6,286,196; U.S. Pat. No. 6,804,884 and/or US patent publication no. 2004/134063, the entire disclosures of which have been incorporated herein by reference.

BRIEF DESCRIPTION OF THE DRAWINGS

The invention will be explained in further detail hereinafter with reference to an illustrative embodiment of a main or output shaft for a motor vehicle transmission shown in the accompanying drawing figures, in which.

DETAILED DESCRIPTION OF PREFERRED EMBODIMENTS

Figure 1:
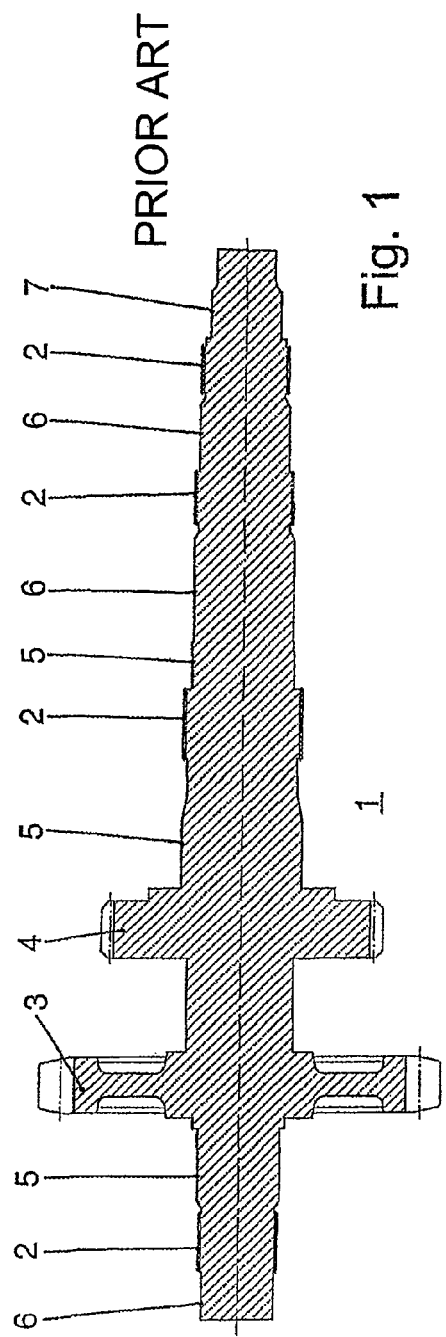
FIG. 1 is a sectional view of a main shaft or output shaft according to the prior art.

The main and/or output shaft 1 from FIG. 1 is produced in one-piece as a forged part and comprises the following machined functional bodies and/or areas: the gearing 2 for the synchronization units; the gearwheels 3 and 4; the bearing races 5 for the roller bodies, e.g., of a needle bearing for mounting the idlers; the bearing seats 6 for mounting the transmission shaft; and the thread 7 for fastening a bearing output flange.

Figure 2:
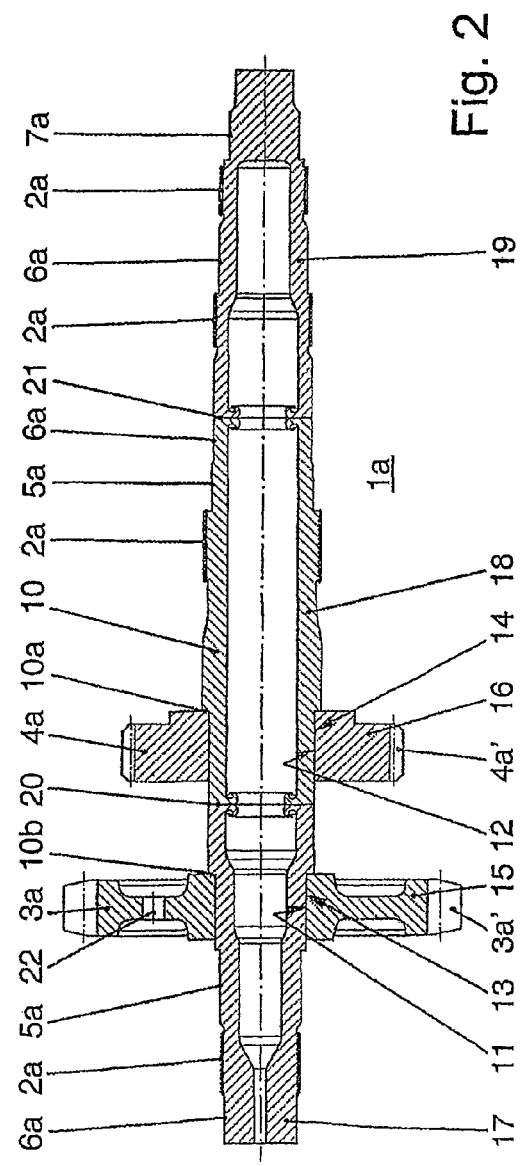
FIG. 2 is a view of a main shaft or output shaft according to the present invention.

In contrast thereto, the main or output shaft 1a according to the present invention as shown in FIG. 2 comprises a shaft main body 10 and two gearwheels 3a and 4a fastened thereon, which are each produced by themselves, i.e. separately, and subsequently are secured to the shaft 10 by being axially pressed on against an axial stop 10a, 10b, e.g., using methods and/or using tools and devices such as those described in U.S. Pat. No. 6,286,196; U.S. Pat. No. 6,804,884 and/or US 2004/134063 as incorporated herein by reference. Consequently, torque-fixed connections which transmit the input and/or drive torque are provided between the shaft seat areas 11, 12 and the hub seat areas 13, 14 of the gearwheels 3a and 4a. The axial length of the hubs 15, 16 at least approximately corresponds to that of the gears 3a' and 4a'. The shaft main body 10 is constructed at least partially hollow and/or sleeve-shaped and comprises three components 17, 18, 19, which are joined at connection points 20 and 21. The connections may be formed by welding, e.g., by laser welding or friction welding or the like.

It is apparent that the separate production of shaft main body 10 and the gearwheels 3a and 4a is simpler, as is the handling of the individual parts separately. In addition, the most suitable material and the most suitable machining method may be used for individual functional sections of the device. The shaft is also significantly lighter than a shaft according to the prior art from FIG. 1; material is saved and the overall costs are significantly less.

The two end pieces 17 and 19 may be produced by mass forming techniques, such as cold and/or hot extrusion, and both end areas may also be constructed hollow and/or tubular. In specific cases, "hydroforming," "swaging," internal high-pressure forming, or "hollow cross wedge rolling" may be suitable as advantageous production possibilities. The middle part 18 may be produced in the same way. The functional areas 2a, 5a, 6a, 7a and the seats 11, 12 may advantageously be machined and/or finish machined after the assembly of the shaft, subsequent to which the gearwheels are pressed on.

The present invention also allows axial openings 22 to be formed in the gearwheel 3a before it is pressed onto the shaft, which results in a savings in material and in a reduction in weight.

The production of a one-piece hollow shaft main body in its at least approximate ultimate form by preceding massive forming and subsequent rotary swaging and/or swaging is explained in greater detail with reference to FIGS. 3 and 4.

Figure 3:
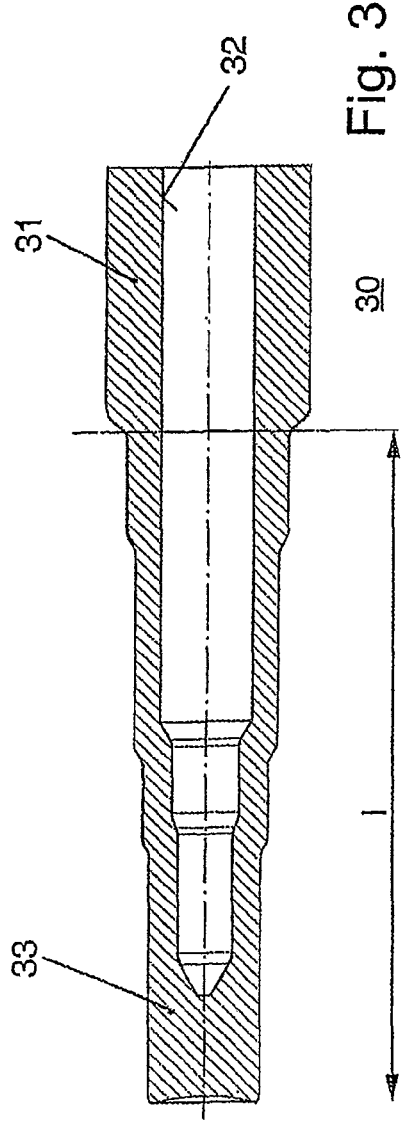
FIG. 3 is a representation of a blank for a shaft main body.
Figure 4:
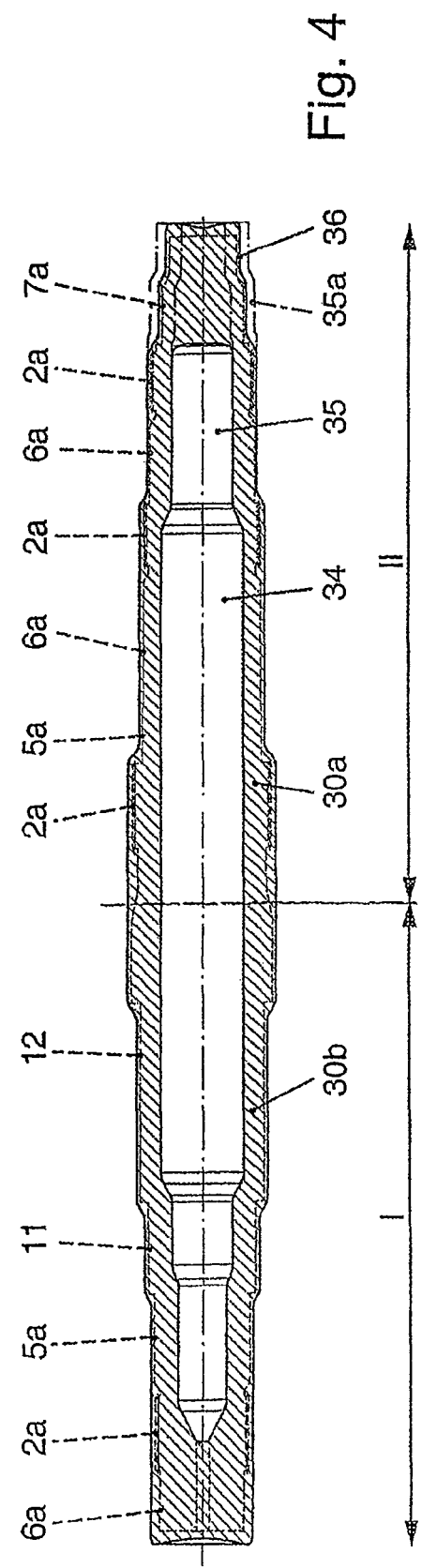
FIG. 4 shows a shaft main body having a first partial area at least substantially brought to its final shape (netshape or near netshape) by mass forming and having a further partial area which is at least substantially brought to its final shape (netshape or near netshape) by swaging and/or rotary swaging.

FIG. 3 shows a preform or blank 30, which is produced by mass forming, in particular by press forming, from a solid material, e.g., from a section cut off from a rod of the material.

The preform 30 comprises a first partial region I, which is brought at least approximately to the final shape of the corresponding area of the finished component. Adjoining the partial region I, the preform has a section 31, formed in one piece therewith, which serves as a material reserve for producing the second partial region, which is to be produced by swaging and/or rotary swaging, of the second partial region II and thus brought at least approximately to the finished dimensions (FIG. 4). The preform 30 also comprises a hollow or recess 32, also introduced by mass forming, which extends at least approximately up to the end area 33.

As already noted, the partial section II is shaped by rotary swaging and/or swaging from the material reserve 31, using mandrels, a first mandrel being used in the section 34 and a further mandrel being used to produce the section 35. The area 35a illustrated using broken lines may be constructed tubular with the aid of the same mandrel. By using further mandrels, the area 36 may be brought to a smaller diameter, e.g., into the shape shown by dot-dashed lines, and finally shaped by further swaging and/or forging into a solid extension or journal 36, which may be constructed at least liquid-tight, and preferably even gas-tight. The penetration of transmission oil into the transmission shaft, which may cause imbalance, is thus prevented.

The shaft main body 30a brought at least approximately to its final shape ("netshape" or "near netshape") may then be brought by chip-forming metalworking or machining to its ultimate final shape 30b, shown by broken lines, namely the bearing seat 6a, the gearings for the synchronization 2a, the bearing races 5a, the seat areas 11 and 12 for the gearwheels, the gearing 2a for the synchronization, the bearing races 5a, the bearing seat 6a, the further gearing 2a for the synchronization, the bearing seat 6a, and a third gearing 2a for the synchronization, and the threaded area 7a. However, it may also be advantageous to produce the gearing 2a by so-called axial forming.

Furthermore, it is apparent that in shafts according to the present invention, the gearwheels 3a and 4a may also be placed at another point and/or the axial area between the gearwheels 3a, 4a may be employed for mounting or accommodation or also attachment of other functional bodies, for example, for the relative mounting of idlers, synchronization bodies, or the like, for example, by which a significantly greater variety of possible designs is provided.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A method for producing a shaft main body, said method comprising:
    providing a preform produced from a solid material by mass forming, said preform consisting of a first partial region and a second partial region, the first of partial region having a shape at least approximately the same as a final shape of a partial region of the shaft main body to be produced, and the second partial region having a material reserve axially adjoining said first partial region, said material reserve having a shorter axial extension than and a diameter at least equal to a maximum diameter of a remaining portion of the shaft main body to be produced; and
    subjecting said material reserve to swaging to form said material reserve into the remaining portion of the shaft main body, wherein said material reserve is formed into the remaining portion of said shaft main body by rotary swaging using at least one mandrel.

2. The method as recited in claim 1, wherein said shaft main body has at least one gearwheel having a hollow hub body fixed on a seat on the shaft main body, said method further comprising axially pressing the gearwheel onto the seat on the shaft main body to form a friction-locked connection for directly transmitting torque between the gearwheel and the shaft.

3. The method as recited in claim 2, wherein at least one functional area selected from the group consisting of bearing seats, gear teeth, bearing races, and gearwheel seats is finish machined on the shaft main body prior to axially pressing the gearwheel onto the gearwheel seat on the shaft main body.

4. The method as recited in claim 1, wherein said preform is at least partially hollow.

5. The method as recited in claim 4, wherein said preform has a closed section in an axial end area of the first partial region.

6. The method as recited in claim 5, wherein said closed section is formed from a hollow body by rotary swaging.

7. The method as recited in claim 1, wherein said preform is continuously hollow along the entire length thereof.

8. The method as recited in claim 1, wherein said remaining portion of the shaft main body is initially hollow, and an axial end area of said remaining portion is closed at least liquid-tight by rotary swaging.

9. The method as recited in claim 1, wherein at least one functional area on said shaft main body is brought at least approximately to finished dimension by rotary swaging, said at least one functional area being selected from the group consisting of bearing seats for mounting the shaft, areas for forming synchronization gearing, bearing races for roller bodies for mounting idlers, and hub seat areas for mounting axially pressed-on gearwheels.

* * * * *